(12) United States Patent
Spaulding et al.

(10) Patent No.: US 11,865,644 B2
(45) Date of Patent: Jan. 9, 2024

(54) BRUSH ASSEMBLY FOR A SOLDERING TOOL CLEANING DEVICE

(71) Applicant: Apex Brands, Inc., Apex, NC (US)

(72) Inventors: James Spaulding, Lexington, SC (US); Kyle Neubauer, Lexington, SC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 18/024,166

(22) PCT Filed: Apr. 20, 2022

(86) PCT No.: PCT/US2022/025529
§ 371 (c)(1),
(2) Date: Mar. 1, 2023

(65) Prior Publication Data
US 2023/0339035 A1    Oct. 26, 2023

(51) Int. Cl.
| | |
|---|---|
| *B23K 3/02* | (2006.01) |
| *B08B 9/02* | (2006.01) |
| *B23K 3/08* | (2006.01) |
| *B08B 1/00* | (2006.01) |
| *A46B 13/00* | (2006.01) |
| *A46B 13/02* | (2006.01) |
| *B08B 1/04* | (2006.01) |

(52) U.S. Cl.
CPC .............. *B23K 3/08* (2013.01); *A46B 13/001* (2013.01); *A46B 13/02* (2013.01); *B08B 1/002* (2013.01); *B08B 1/04* (2013.01); *A46B 2200/3073* (2013.01)

(58) Field of Classification Search
CPC ...... A46B 13/02; A46B 13/001; B23K 1/018; B23K 3/029; B23K 3/028; B23K 3/08
See application file for complete search history.

(56) References Cited

U.S. PATENT DOCUMENTS

| | | | |
|---|---|---|---|
| 3,380,202 A | 4/1968 | Hartinger | |
| 4,662,022 A | 5/1987 | Vogler | |
| 6,029,307 A * | 2/2000 | Baudoin | A46B 7/04 15/176.1 |

(Continued)

OTHER PUBLICATIONS

International Search Report and Written Opinion for International Application No. PCT/US2022/025529 dated Aug. 2, 2022, all pages cited in its entirety.

*Primary Examiner* — Shay Karls
(74) *Attorney, Agent, or Firm* — Burr & Forman LLP (57) ABSTRACT

A brush assembly for a device with a motor for cleaning soldering tools may include a base portion, a brush drive ring, and a locking assembly. The base portion may include a cylindrical core member and a cleaning brush. The cleaning brush may be disposed around a perimeter of the core member and may extend radially away from the core member. The locking assembly may include a first locking member, a second locking member, and an annular retention member. The first and second locking members may be configured to interface with one another. The annular retention member may define a resting state for the locking assembly, in which the first and second locking members may grip a shaft of the motor. The annular retention member may also define a transient state for the locking assembly, in which the first and second locking members may move out of the resting state.

25 Claims, 8 Drawing Sheets

(56) References Cited

U.S. PATENT DOCUMENTS

| | | | |
|---|---|---|---|
| 7,296,580 B1 * | 11/2007 | Sbardella | A45D 20/50 132/122 |
| 2002/0042960 A1 | 4/2002 | Hayashi | |
| 2007/0284419 A1 | 12/2007 | Matlack et al. | |
| 2017/0209903 A1 | 7/2017 | Sykes | |

* cited by examiner

BRUSH ASSEMBLY FOR A SOLDERING TOOL CLEANING DEVICE

TECHNICAL FIELD

Example embodiments generally relate to soldering tool cleaning devices, and, in particular, relate to a brush assembly configured to clean the tip of the soldering tool.

BACKGROUND

Soldering tools, which are sometimes referred to as soldering irons or soldering guns, are commonly used in electronics manufacturing and repair activities along with other crafts and industries that involve metalwork. Soldering tools are typically used to join metallic items together at a joint by melting a filler metal (i.e., solder) into the joint. The solder has a lower melting point than the items being joined together at the joint, so the soldering tool needs to apply heat sufficient to melt the solder, but not hot enough to melt the items being joined.

Although a number of soldering tool designs have been proposed, a basic soldering tool design includes at least a tip portion that is operably coupled to a heater. The tip portion may, due to operation of the heater, become hot enough to melt the solder that contacts the tip portion. The tip portion may, in some cases, be removable/interchangeable so that a number of different geometries (e.g., sizes and/or shapes) of tips or bits can be substituted for respective different jobs.

Despite the various tip geometries soldering tools may include, many soldering tool tips may still be susceptible to the buildup of excess filler material. Filler material building up on the tip of the soldering tool may have negative effects on the precision and performance of the soldering tool in use, and as such, many soldering tools may need to be cleaned before, during and/or after use.

As can be appreciated from the limitations described above, it may be desirable to improve the mechanism for cleaning soldering tools. For example, improvements in brush assembly design may enable a more efficient overall cleaning operation.

BRIEF SUMMARY OF SOME EXAMPLES

Some example embodiments may provide for a device for cleaning soldering tools. The device may include a housing, a motor that may be enclosed within the housing, a brush assembly that may be operably coupled to the motor, and an access window through which the brush assembly may be accessible from a position outside of the housing. The brush assembly may include a base portion which may include a cylindrical core member and a cleaning brush, a driving interface that may be configured to transfer torque from the motor to the base portion, and a locking assembly that may be disposed at a distal end of the base portion opposite the driving interface. The cleaning brush may be disposed around a perimeter of the core member and may extend radially away from the core member. The locking assembly may include a first locking member, a second locking member, and an annular retention member. The first and second locking members may be configured to interface with one another. The annular retention member may define a resting state for the locking assembly, in which the first and second locking members may grip a motor shaft of the motor. The annular retention member may also define a transient state for the locking assembly, in which the first and second locking members may move out of the resting state.

In another example embodiment, a brush assembly for a device with a motor for cleaning soldering tools may be provided. The brush assembly may include a base portion which may include a cylindrical core member and a cleaning brush, a driving interface that may be configured to transfer torque from the motor to the base portion, and a locking assembly that may be disposed at a distal end of the base portion opposite the driving interface. The cleaning brush may be disposed around a perimeter of the core member and may extend radially away from the core member. The locking assembly may include a first locking member, a second locking member, and an annular retention member. The first and second locking members may be configured to interface with one another. The annular retention member may define a resting state for the locking assembly, in which the first and second locking members may grip a motor shaft of the motor. The annular retention member may also define a transient state for the locking assembly, in which the first and second locking members may move out of the resting state.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1A:
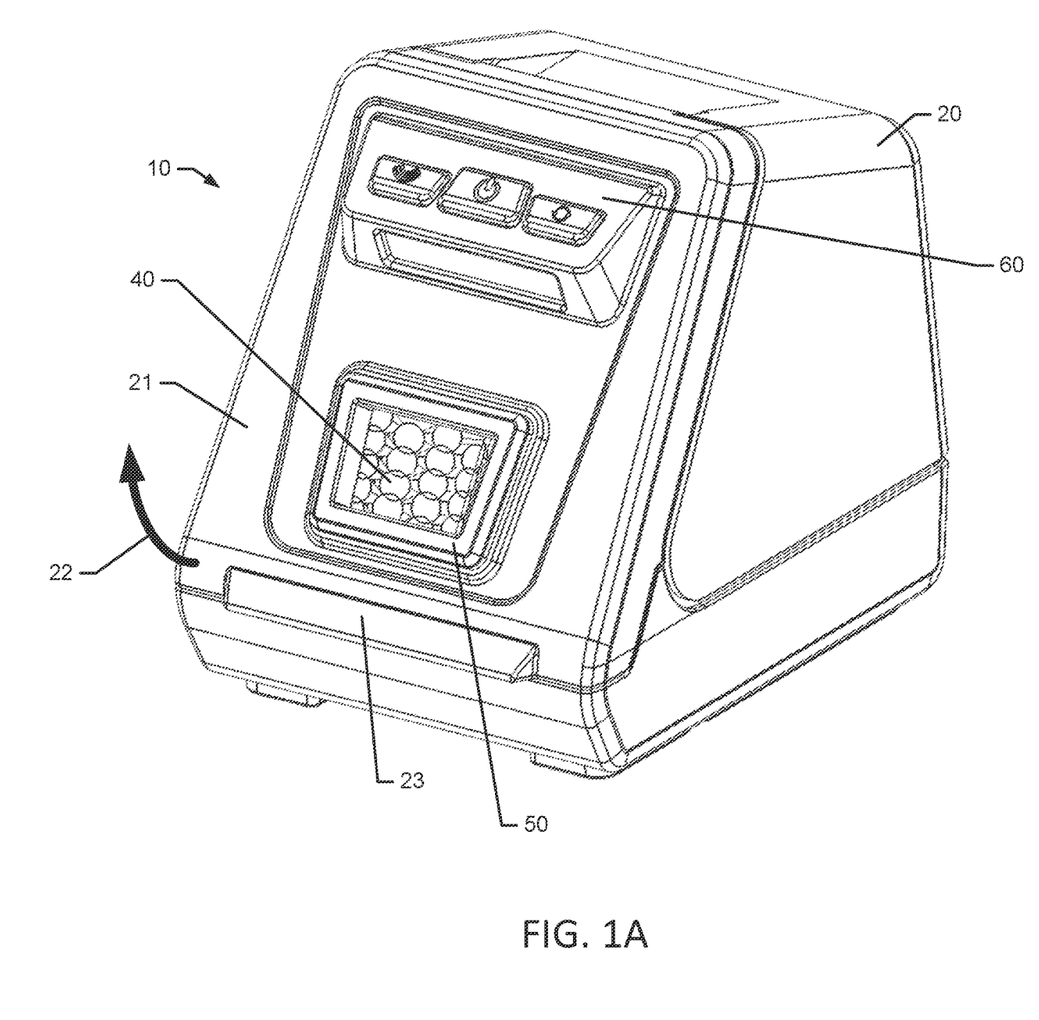
FIG. 1A illustrates a perspective view of a soldering tool cleaning device according to an example embodiment.
Figure 1B:
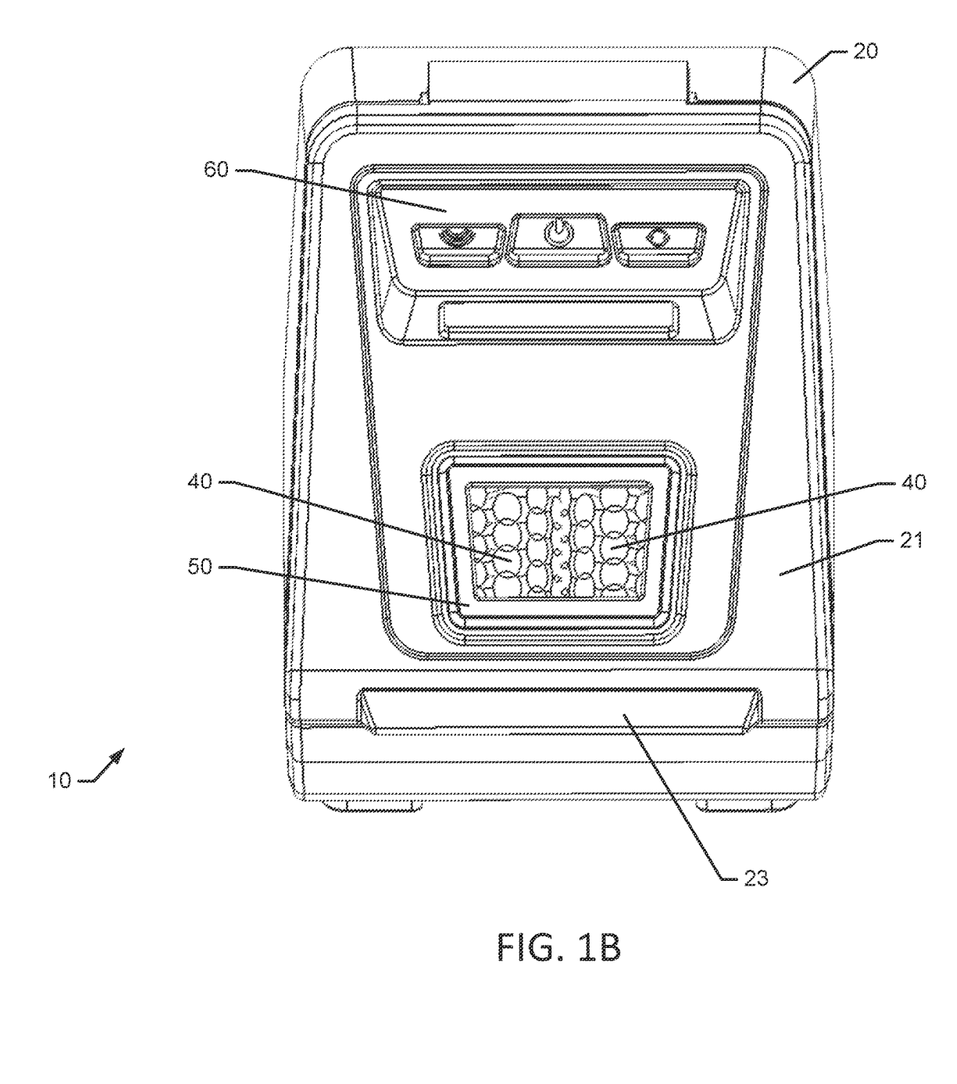
FIG. 1B illustrates a front view of the soldering tool cleaning device of FIG. 1A in accordance with an example embodiment.

FIG. 1, which includes FIGS. 1A and 1B, illustrates a device 10 for cleaning soldering tools according to an example embodiment. FIG. 1A illustrates a perspective view of the device 10, and FIG. 1B illustrates a front view of the device 10 according to an example embodiment. In some embodiments, the device 10 may include a housing 20, a motor 30 that may be enclosed within the housing 20, a brush assembly 40 that may be operably coupled to the motor 30, and an access window 50 through which the brush assembly 40 may be accessible from a position outside of the housing 20. In this regard, the access window 50 may be configured to have a soldering tool (not pictured) inserted therethrough in order to access the brush assembly 40 for cleaning a tip of the soldering tool.

The device 10 may also include a control panel 60 which, in some embodiments, may be used to power the device 10 on and/or off by controlling the flow of electricity to the motor 30. In some embodiments, the control panel 60 may also allow the operator to control more particular settings, such as the rotational speed of the brush assembly 40, the direction of rotation of the brush assembly 40 and/or apply a vibration function to the brush assembly 40 to further aid in cleaning the soldering tool. In some cases, a front face 21 of the housing 20 may be configured to lift in the direction of arrow 22 via handle 23 and provide access to internal space within the device 10. Lifting the front face 21 may allow an operator to more easily access the brush assembly 40 in order to service the device 10. For example, an operator may need to replace the brush assembly 40 in the event that the brush assembly 40 may become worn down and less capable of efficiently cleaning the soldering tool. In some embodiments, the device 10 may include more than one motor 30 and more than one brush assembly 40. In such cases, the brush assemblies 40 may be configured to operate in a complimentary manner to efficiently clean the tip of the soldering tool.

Figure 2:
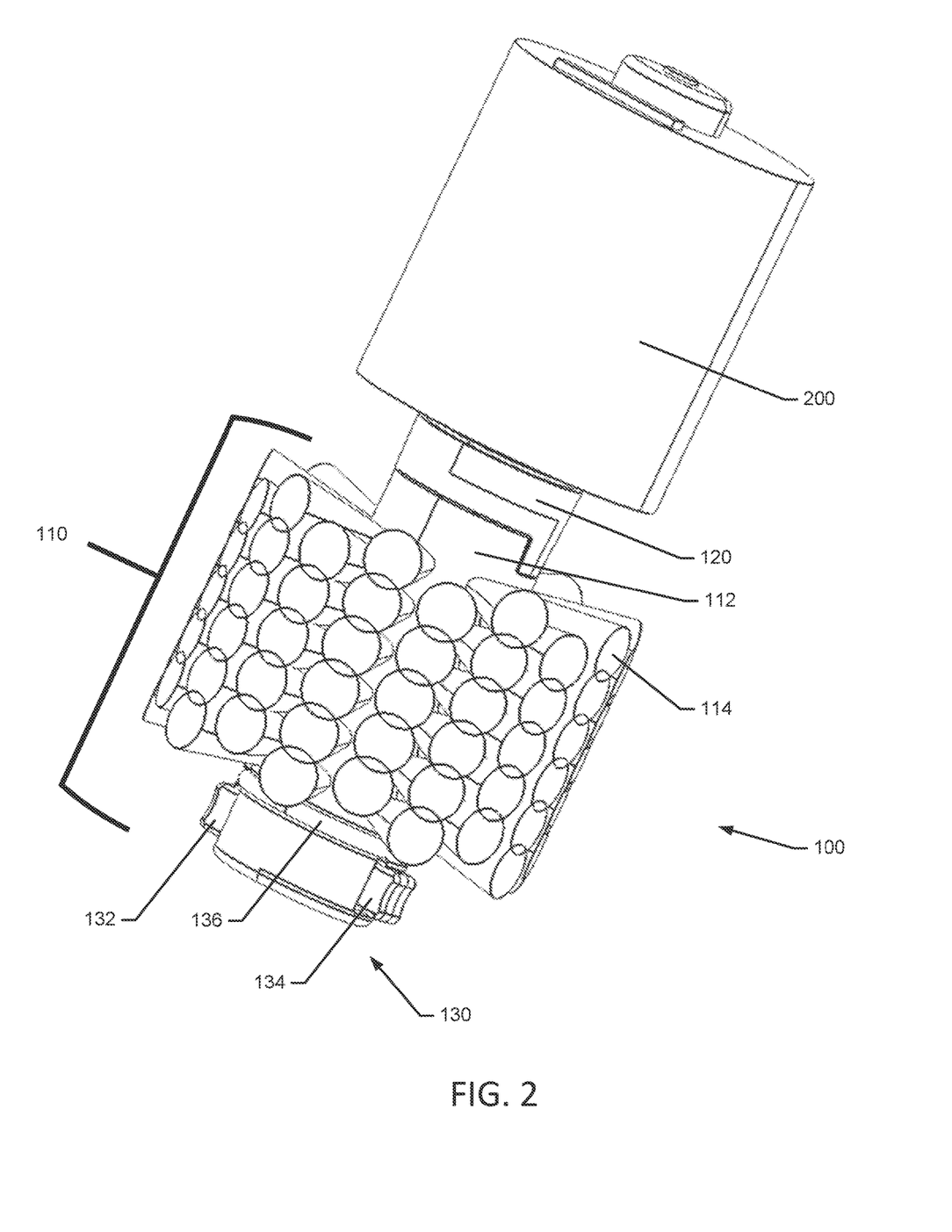
FIG. 2 illustrates a perspective view of a brush assembly operably coupled to a motor of the soldering tool cleaning device in accordance with an example embodiment.

FIG. 2 illustrates a perspective view of a brush assembly 100 operably coupled to a motor 200 of the soldering tool cleaning device 10, according to an example embodiment. The brush assembly 100 may include a base portion 110, a brush drive ring 120, and a locking assembly 130. In some embodiments, the brush drive ring 120 may operably couple to a driving interface 111 of the base portion 110 to a motor shaft 210 (better seen in FIG. 3A). In this regard, the motor 200 may generate torque that the brush drive ring 120 may transfer to the driving interface 111 in order to rotate the base portion 110 accordingly. In some embodiments, the base portion 110 may include a substantially cylindrical core member 112 and a cleaning brush 114. The cleaning brush 114 may be disposed around an entire perimeter of the core member 112, and may extend radially away from the core member 112. The torque applied to the base portion 110 may rotate the core member 112 and may accordingly move the cleaning brush 114 to clean the soldering tool more effectively. In order to more efficiently transfer torque from the motor shaft 210, the brush drive ring 120 may include particular structures integrated therein that may be configured to interface with corresponding structures in the driving interface 111 and the motor 200. In this regard, the brush drive ring 120 may be configured to interlock with both the driving interface 111 of the base portion 110 and the motor shaft 210. Further details of the brush drive ring 120 will be discussed below in reference to later figures.

The locking assembly 130 may be disposed at a distal end of the base portion 110 opposite the driving interface 111. The locking assembly 130 may include a first locking member 132, a second locking member 134, and an annular retention member 136. The first and second locking members (132, 134) may be configured to interface with one another in an interior region of the core member 112. In some embodiments, the first and second locking members (132, 134) may be configured to interlock with each other. The first and second locking members (132, 134) may also be configured to slide relative to one another responsive to either a force provided by an operator or a force provided by the annular retention member 136. In some embodiments, the annular retention member 136 may be an elastic ring (e.g. an o-ring) disposed around the perimeter of the core member 112 in an annular retention member groove. Due to its elastic nature, the annular retention member 136 may define both a resting state and a transient state for the locking assembly 130.

In the resting state, the first and second locking members (132, 134) may grip the motor shaft 210, and the annular retention member 136 may be in contact with the core member 112. In the transient state, the first and second locking members (132, 134) may move out of the resting state, and the annular retention member 136 may be stretched away from the core member 112 by the first and second locking members (132, 134). In this regard, the annular retention member 136 may bias the first and second locking members (132, 134) into the resting state. In other words, without a force biasing the first and second locking members (132, 134) apart, the annular retention member 136 may ensure that the first and second locking members (132, 134) remain in the resting state, and thus that the base portion 110 remains operably coupled to the motor shaft 210. In the event that there may be a force biasing the first and second locking members (132, 134) apart, the annular retention member 136 may stretch and accordingly allow the first and second locking members (132, 134) to enter the transient state. Further details of the locking assembly 130 will be discussed below in reference to later figures.

Figure 3A:
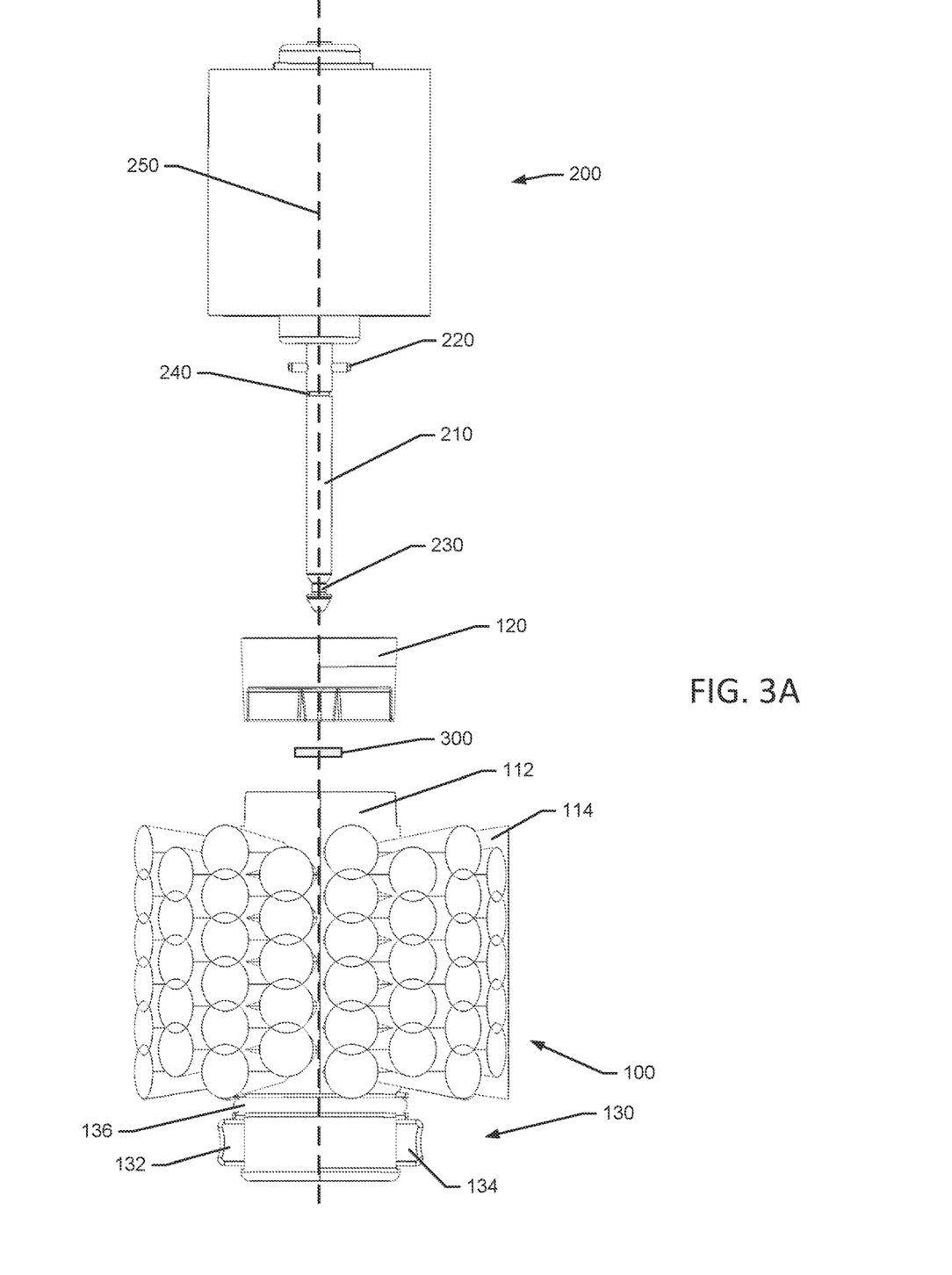
FIG. 3A illustrates an exploded side view of the brush assembly of the soldering tool cleaning device in accordance with an example embodiment.

FIG. 3A illustrates an exploded side view of the brush assembly 100 of the soldering tool cleaning device 10 in accordance with an example embodiment. As depicted in FIG. 3A, the motor 200 may include a motor shaft 210, a drive pin 220, an engagement groove 230 disposed at a distal end of the motor shaft 210, and a retention groove 240 proximate to the drive pin 220. In this regard, the first and second locking members (132, 134) may be configured to grab the engagement groove 230 in the resting state in order to operably couple the brush assembly 100 to the motor 200. When the brush assembly 100 is operably coupled to the motor 200, the retention groove 240 may be configured to operably couple with a drive ring retaining clip 300. In some embodiments, the drive ring retaining clip 300 may be configured to hold the brush drive ring 120 in contact with the drive pin 220 of the motor shaft 210. As such, the brush drive ring 120 may remain in contact with the drive pin 220 of the motor 200 even in the event that the base portion 110 has been removed from the motor shaft 210. As can be appreciated from FIG. 3A, the motor shaft 210 may extend through an entire length of the base portion 110 along a longitudinal axis 250 of the brush assembly 100. The motor 200, the drive brush ring 120, the drive ring retaining clip 300, and the base portion 110 may all be coaxial about the longitudinal axis 250.

Figures 3B, 3C, 3D:
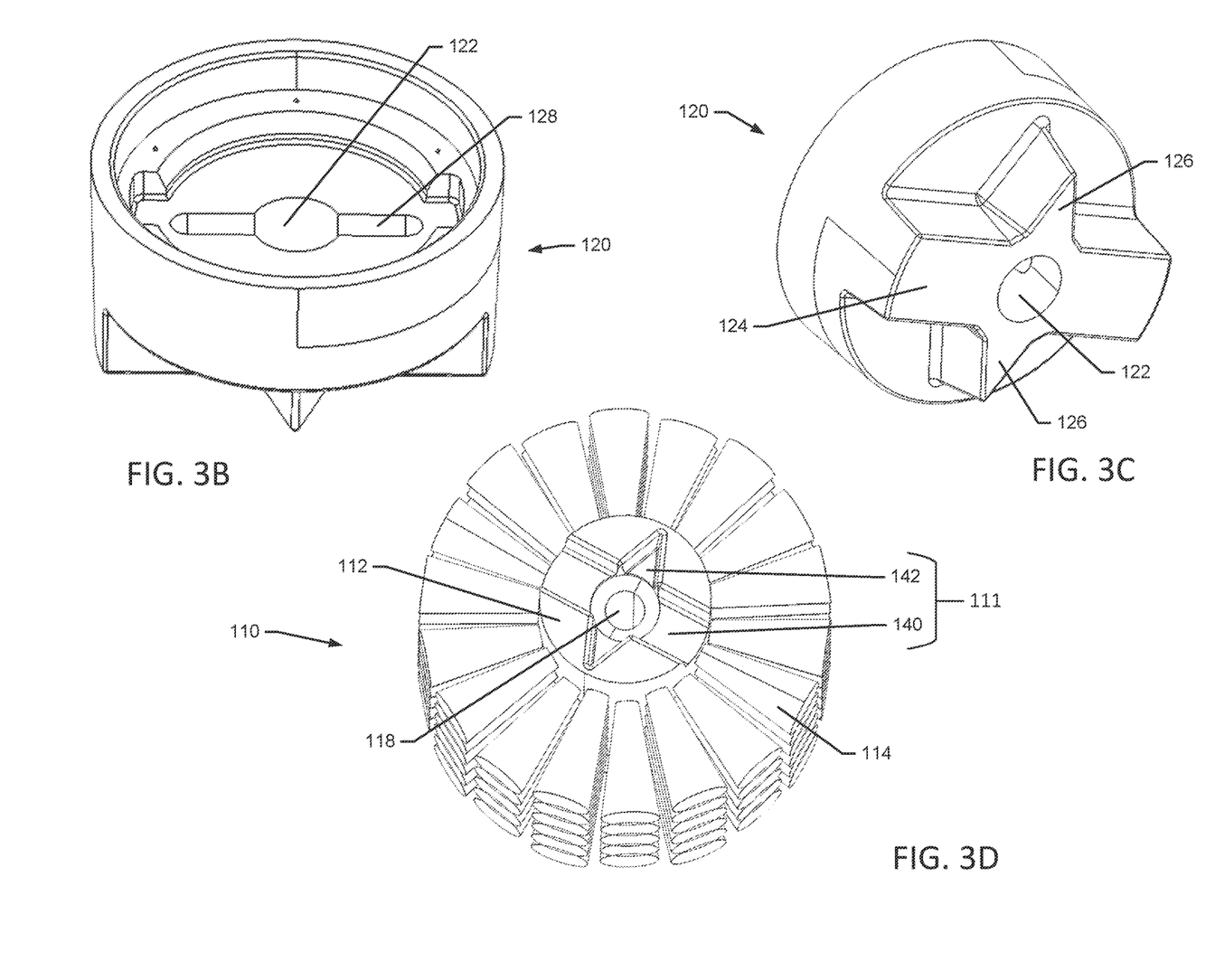
FIG. 3B illustrates a perspective view of a brush drive ring in accordance with an example embodiment.
FIG. 3C illustrates a perspective view of a brush drive ring in accordance with an example embodiment.
FIG. 3D illustrates a perspective view of a base portion of the brush assembly in accordance with an example embodiment.

FIGS. 3B and 3C illustrate perspective views of a brush drive ring 120 according to an example embodiment, while FIG. 3D illustrates a perspective view of a base portion 110 of the brush assembly 100 according to an example embodiment. As seen in FIG. 3B, the brush drive ring 120 may be configured with a central bore 122 which may be coaxial with the longitudinal axis 250 and thus align with the motor shaft 210. In some embodiments, the drive pin 220 may be the primary mechanism through which the torque generated by the motor 200 is transferred to the brush drive ring 120. Therefore, a drive pin recess 128 may be formed in the brush drive ring 120 proximate to the central bore 122. The drive pin recess 128 may be configured to receive the drive pin 220 when the brush drive ring 120 is operably coupled to the motor 200. The motor shaft 210 may extend through the central bore 122 of the brush drive ring 120, while the drive pin 220 may remain held in the drive pin recess 128. Thus, when the motor shaft 210 (and thus the drive pin 220) rotates, so too does the brush drive ring 120. In this regard, the drive pin 220 and the drive pin recess 128 may resemble any corresponding shapes suitable for transferring torque (i.e. shapes capable of interfacing with one another such that the rotation of one may cause the rotation of the other). In some embodiments, the drive pin 220 may resemble a rod-like shape and the drive pin recess 128 may resemble an elongated slot configured to receive the rod-like shape.

As seen in FIG. 3C, surrounding the central bore 122 may be a drive projection 124 and key projections 126. In some embodiments, the drive projection 124 and key projections 126 may be the primary mechanisms by which torque is transferred from the brush drive ring 120 to the driving interface 111. In this regard, the central bore 122, the drive projection 124 and the key projections 126 may all align with the driving interface 111 of the core member 112. Therefore, as shown in FIG. 3D, the driving interface 111 may include a receiving channel 140 and key slots 142 disposed on an opposite end of the core member 112 from the locking assembly 130. The receiving channel 140 and key slots 142 may be configured to interface with the drive projection 124 and key projections 126 in a manner such that the brush drive ring 120 may easily transfer torque to the driving interface 111 of the base portion 110.

In some embodiments, the drive projection 124 may be substantially rectangular, but it should be appreciated that the drive projection 124 may also resemble any other shape(s) suitable for transferring torque. Additionally, in some embodiments, the key projections 126 may be substantially triangular, but it should be appreciated that the key projections 126 may also resemble any other shape(s) suitable for transferring torque. In any case, the receiving channel 140 and key slots 142 may be configured to interface with the drive projection 124 and key projections 126, respectively, such that the motor shaft 210 may be inserted through both the brush drive ring 120 and the base portion 110.

Figure 4:
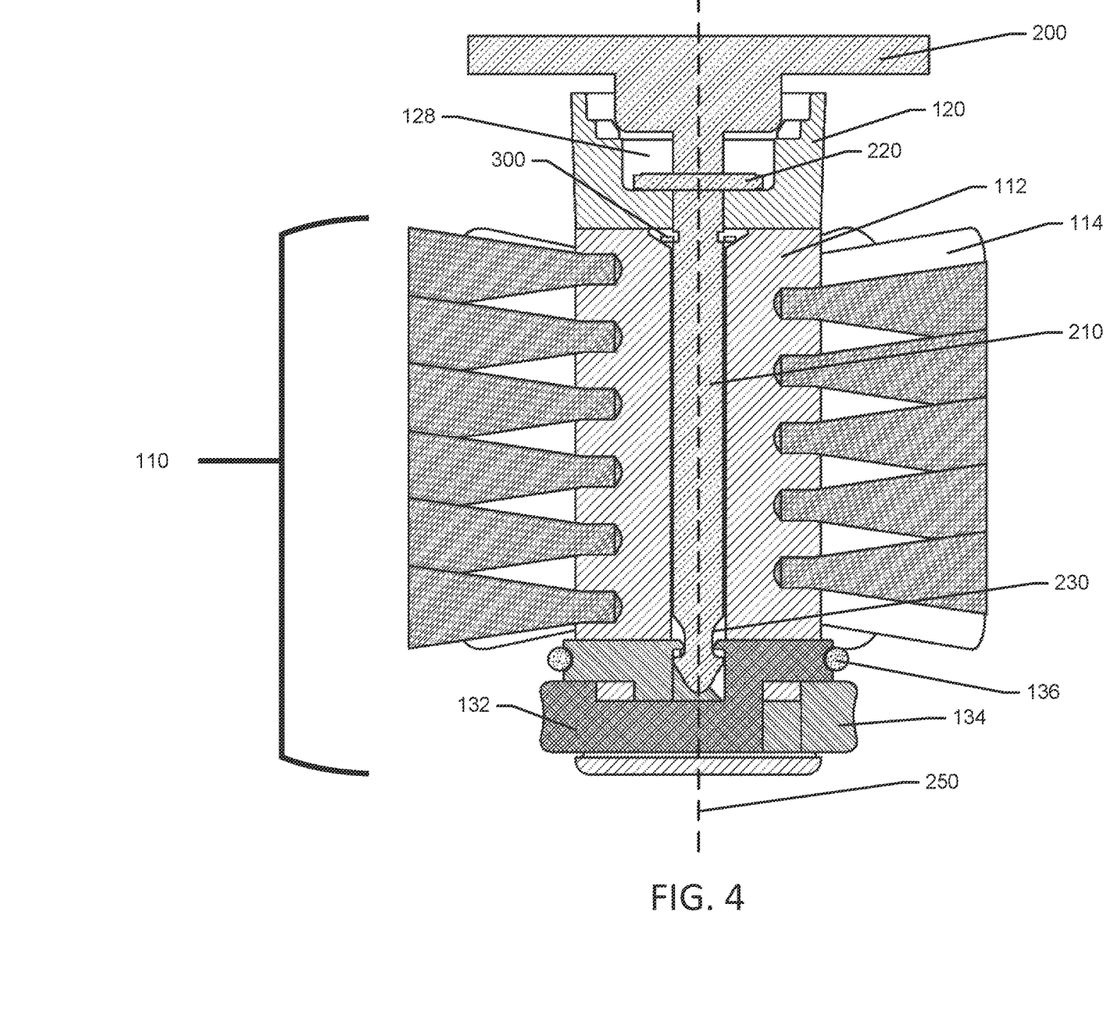
FIG. 4 illustrates a section view of the brush assembly in accordance with an example embodiment.

FIG. 4 illustrates a section view of the brush assembly 100 according to an example embodiment. In the embodiment of FIG. 4, the locking assembly 130 may operably couple the base portion 110 directly to the motor shaft 210 such that the brush assembly 100 does not slide off of the end of, and out of contact with, the motor 200. In this regard, the locking assembly 130 may grip the engagement groove 230 of the motor shaft 210 in the resting state. Accordingly, in the resting state, the motor shaft 210 may not be permitted to move relative to the base portion 110.

In some embodiments, the base portion 110 may be removed from the motor 200. Responsive to a force directed substantially perpendicular to the longitudinal axis 250, and applied simultaneously to the first and second locking members (132, 134), the locking assembly 130 may enter the transient state. With the locking assembly 130 in the transient state, the base portion 110 may be permitted to move relative to the motor shaft 210, and as such, the base portion 110 may then be removed from contact with the motor shaft 210. In some cases, the brush drive ring 120 may remain operably coupled to the motor 200 following the removal of the base portion 110.

With an outgoing base portion 110 removed from the motor 200, an incoming base portion 110 may be inserted onto the motor shaft 210. In this regard, the base portion 110 is positioned such that a central tunnel 118 aligns with the motor shaft 210 and thus also with the longitudinal axis 250. The core member 112 may then need to be rotated until the receiving channel 140 and key slots 142 of the driving interface 111 may be aligned with the drive projection 124 and key projections 126 of the brush drive ring 120. Following the alignment of the receiving channel 140 and key slots 142 with the drive projection 124 and key projections 126, the operator may then apply a force to the core member 112 that is directed substantially parallel to the longitudinal axis 250 in order to insert the drive projection 124 and key projections 126 into the receiving channel 140 and key slots 142, respectively. In some cases, while the drive projection 124 and key projections 126 are being inserted into the receiving channel 140 and key slots 142, the first and second locking members (132, 134) may be forced apart in directions substantially perpendicular to the longitudinal axis 250 by a tip of the motor shaft 210 since the locking assembly 130 may be in the transient state. In this regard, the tip of the motor shaft 210 may be formed with a substantially bell-shaped profile such that the act of inserting the motor shaft 210 into the base portion 110 may provide sufficient force to induce sliding of the first locking member 132 relative to the second locking member 134. As such, the motor shaft 210 may then move into the first and second locking members (132, 134), after which the annular retention member 136 may bias the locking assembly back into the resting state where the first and second locking members (132, 134) may grip the engagement groove 230 of the motor shaft 210. Responsive to the first and second locking members (132, 134) gripping the engagement groove 230, the base portion 110 may be operably coupled to the motor 200 and may no longer move relative to the motor shaft 210.

Figure 5A:
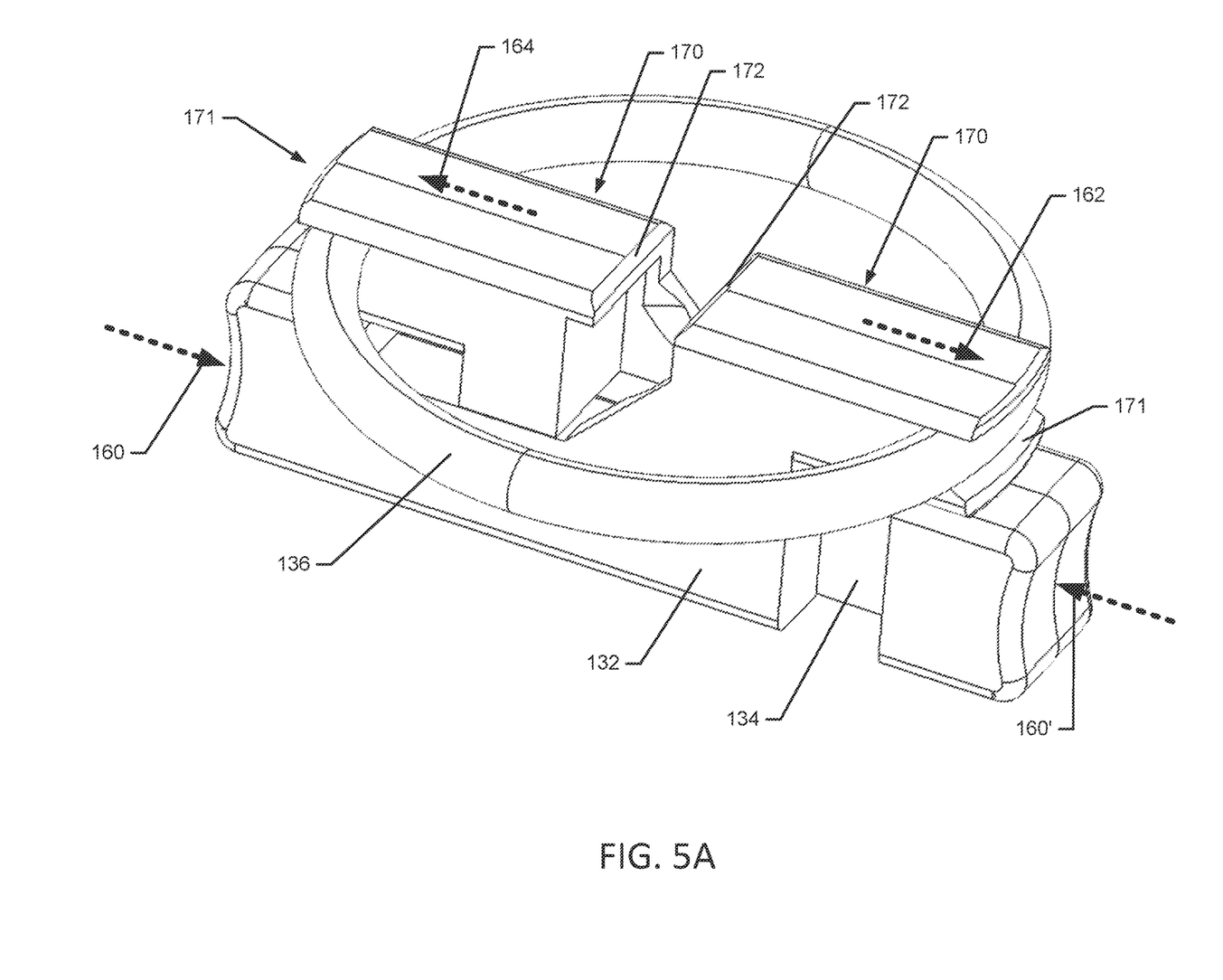
FIG. 5A illustrates a perspective view of a locking assembly of the brush assembly in accordance with an example embodiment.
Figure 5B:
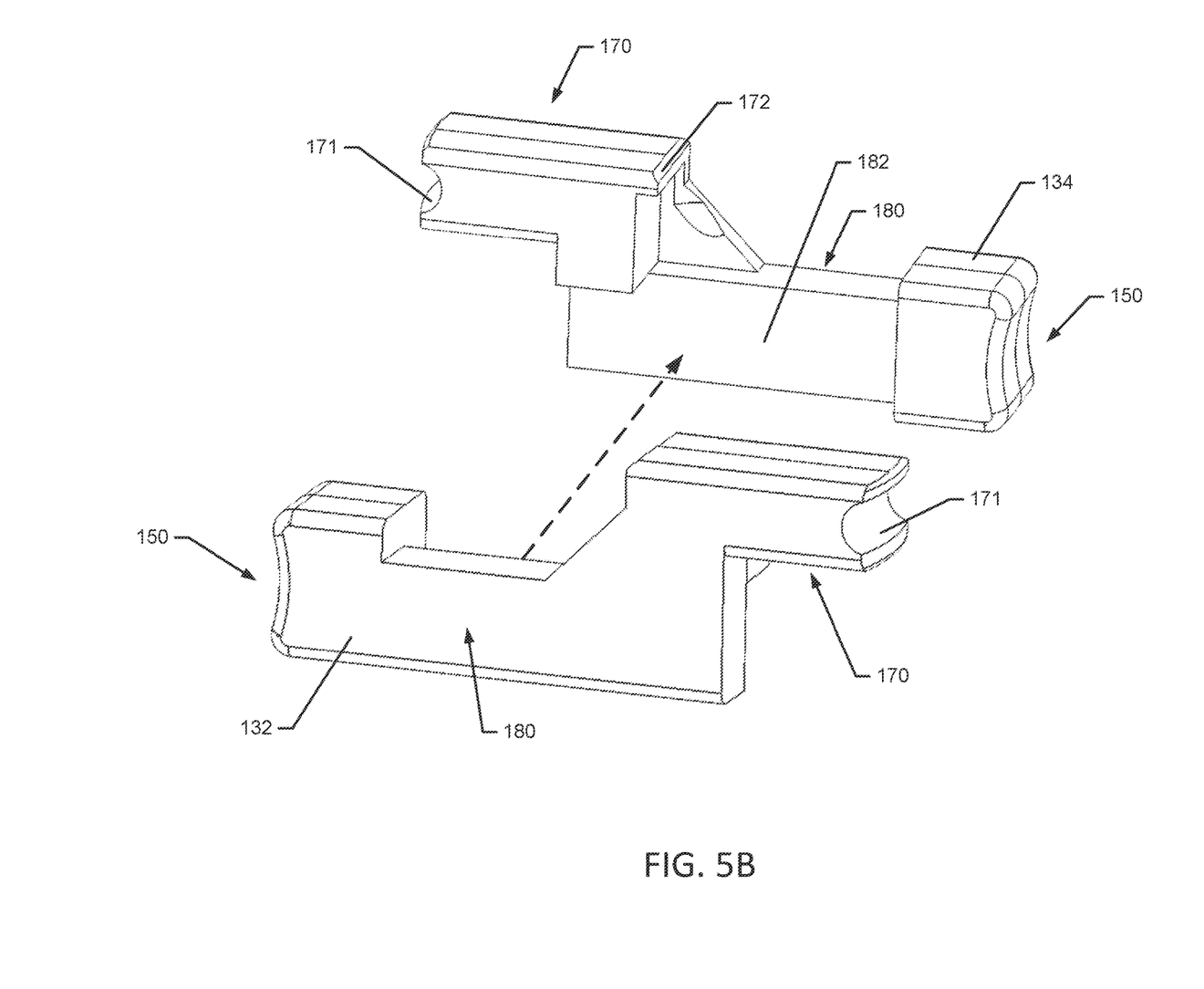
FIG. 5B illustrates an exploded perspective view of the locking assembly in accordance with an example embodiment.

FIG. 5A illustrates a perspective view of a locking assembly 130 according to an example embodiment, and FIG. 5B illustrates an exploded perspective view of the first and second locking members (132, 134) according to an example embodiment. As seen in FIGS. 5A and 5B, each of the first and second locking members (132, 134) may include a push tab 150 which may be configured to be receive forces from an operator in the directions of arrows 160 and 160'. Responsive to receiving the forces from the operator, the first locking member 132 and the second locking member 134 may each apply a force to the annular retention member 136 in the direction of arrows 162 and 164, respectively. In this regard, each of the first and second locking members (132, 134) may include an engagement portion 170, which may include an annular retention member channel 171, and an engagement notch 172. Accordingly, the annular retention member channel 171 may be configured to operably couple with the annular retention member 136 while the engagement notch 172 may be configured to operably couple with the engagement groove 230 on the motor shaft 210 when the locking assembly 130 is in the resting state.

Furthermore, each of the first and second locking members (132, 134) may include a body portion 180 which may operably couple the push tab 150 to the engagement portion 170. In some embodiments, the body portion 180 may include a sliding surface 182. The first locking member 132 may be configured to contact, and slide relative to, the second locking member 134 at each locking member's respective sliding surface 182. In this regard, the sliding surface 182 of each of the first and second locking members (132, 134) may slide relative to each other when the locking assembly 130 is in the transient state. Accordingly, the sliding surface 182 may be a substantially planar surface of the body portion 180 such that there are minimal obstructions to the sliding relationship of the first locking member 132 with the second locking member 134. In an example embodiment, the body portion 180 of the first locking member 132 may be disposed on an opposite side of the motor shaft 210 (and thus the longitudinal axis 250) from the body portion 180 of the second locking member 134.

Some example embodiments may provide for a device for cleaning soldering tools. The device may include a housing, a motor that may be enclosed within the housing, a brush assembly that may be operably coupled to the motor, and an access window through which the brush assembly may be accessible from a position outside of the housing. The brush assembly may include a base portion which may include a cylindrical core member and a cleaning brush, a driving interface that may be configured to transfer torque from the motor to the base portion, and a locking assembly that may be disposed at a distal end of the base portion opposite the driving interface. The cleaning brush may be disposed around a perimeter of the core member and may extend radially away from the core member. The locking assembly may include a first locking member, a second locking member, and an annular retention member. The first and second locking members may be configured to interface with one another. The annular retention member may define a resting state for the locking assembly, in which the first and second locking members may grip a motor shaft of the motor. The annular retention member may also define a transient state for the locking assembly, in which the first and second locking members may move out of the resting state.

The device of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the motor shaft may include an engagement groove at a distal end. In an example embodiment, the first and second locking members may engage with the engagement groove in the resting state to operably couple the brush assembly to the motor. In some cases, the first and second locking members may each include a push tab which may be configured to be depressed by an operator, an engagement portion which may be configured to engage with the annular retention member and the motor shaft, and a body portion which may operably couple the push tab to the engagement portion. In an example embodiment, the body portion of the first locking member may be disposed on an opposite side of the motor shaft from the body portion of the second locking member. In some cases, the engagement portion may include an annular retention member channel which may be configured to operably couple with the annular retention member. In an example embodiment, the engagement portion may further include a retention notch which may be configured to operably couple with the engagement groove on the motor shaft. In some cases, the body portion of each of the first and second locking members may include a sliding surface. In an example embodiment, the first and second locking members may contact each other at the respective sliding surfaces of the first and second locking members. In some cases, the sliding surfaces of each of the first and second locking members may slide relative to each other in the transient state. In an example embodiment, the locking assembly may enter the transient state responsive to the operator depressing the push tab on each of the first and second locking members. In some cases, the locking assembly may enter the transient state responsive to the insertion of a tip of the motor shaft that may force the first and second locking members out of the resting state. In an example embodiment, the driving interface of the core member may include a receiving channel and key slots. In some cases, the driving interface may operably couple to a brush drive ring that may include a drive projection and key projections. In an example embodiment, the receiving channel and key slots may be configured to interface with the drive projection and key projections. In some cases, the brush drive ring may further comprise a drive pin recess that may be configured to interface with a drive pin of the motor shaft. In an example embodiment, the motor shaft may further include a retention groove proximate to the drive pin. In some cases, the retention groove may be configured to operably couple to a drive ring retaining clip. In an example embodiment, the drive ring retaining clip may be configured to hold the brush drive ring in contact with the drive pin of the motor shaft.

Some example embodiments may provide for a brush assembly for a device with a motor for cleaning soldering tools. The brush assembly may include a base portion which may include a cylindrical core member and a cleaning brush, a driving interface that may be configured to transfer torque from the motor to the base portion, and a locking assembly that may be disposed at a distal end of the base portion opposite the driving interface. The cleaning brush may be disposed around a perimeter of the core member and may extend radially away from the core member. The locking assembly may include a first locking member, a second locking member, and an annular retention member. The first and second locking members may be configured to interface with one another. The annular retention member may define a resting state for the locking assembly, in which the first and second locking members may grip a motor shaft of the motor. The annular retention member may also define a transient state for the locking assembly, in which the first and second locking members may move out of the resting state.

The brush assembly of some embodiments may include additional features, modifications, augmentations and/or the like to achieve further objectives or enhance performance of the brush assembly. The additional features, modifications, augmentations and/or the like may be added in any combination with each other. Below is a list of various additional features, modifications, and augmentations that can each be added individually or in any combination with each other. For example, the motor shaft may include an engagement groove at a distal end. In an example embodiment, the first and second locking members may engage with the engagement groove in the resting state to operably couple the brush assembly to the motor. In some cases, the first and second locking members may each include a push tab which may be configured to be depressed by an operator, an engagement portion which may be configured to engage with the annular retention member and the motor shaft, and a body portion which may operably couple the push tab to the engagement portion. In an example embodiment, the body portion of the first locking member may be disposed on an opposite side of the motor shaft from the body portion of the second locking member. In some cases, the engagement portion may include an annular retention member channel which may be configured to operably couple with the annular retention member. In an example embodiment, the engagement portion may further include a retention notch which may be configured to operably couple with the engagement groove on the motor shaft. In some cases, 5 the body portion of each of the first and second locking members may include a sliding surface. In an example embodiment, the first and second locking members may contact each other at the respective sliding surfaces of the first and second locking members. In some cases, the sliding surfaces of each of the first and second locking members may slide relative to each other in the transient state. In an example embodiment, the locking assembly may enter the transient state responsive to the operator depressing the push tab on each of the first and second locking members. In some cases, the locking assembly may enter the transient state responsive to the insertion of a tip of the motor shaft that may force the first and second locking members out of the resting state. In an example embodiment, the driving interface of the core member may include a receiving channel and key slots. In some cases, the driving interface may operably couple to a brush drive ring that may include a drive projection and key projections. In an example embodiment, the receiving channel and key slots may be configured to interface with the drive projection and key projections. In some cases, the brush drive ring may further comprise a drive pin recess that may be configured to interface with a drive pin of the motor shaft. In an example embodiment, the motor shaft may further include a retention groove proximate to the drive pin. In some cases, the retention groove may be configured to operably couple to a drive ring retaining clip. In an example embodiment, the drive ring retaining clip may be configured to hold the brush drive ring in contact with the drive pin of the motor shaft.

Some example embodiments may provide for a locking assembly for a brush assembly of a soldering tool cleaning device with a motor. The locking assembly may include a first locking member, a second locking member, and an annular retention member. The first and second locking members may be configured to interface with one another. The annular retention member may define a resting state for the locking assembly, in which the first and second locking members may grip a motor shaft of the motor. The annular retention member may also define a transient state for the locking assembly, in which the first and second locking members may move out of the resting state.

The locking assembly of some embodiments may include additional features, modifications, augmentations and/or the like to achieve further objectives or enhance performance of the locking assembly. The additional features, modifications, augmentations and/or the like may be added in any combination with each other. Below is a list of various additional features, modifications, and augmentations that can each be added individually or in any combination with each other. For example, the motor shaft may include an engagement groove at a distal end. In an example embodiment, the first and second locking 5 members may engage with the engagement groove in the resting state to operably couple the brush assembly to the motor. In some cases, the first and second locking members may each include a push tab which may be configured to be depressed by an operator, an engagement portion which may be configured to engage with the annular retention member and the motor shaft and a body portion which may operably couple the push tab to the engagement portion. In an example embodiment, the body portion of the first locking member may be disposed on an opposite side of the motor shaft from the body portion of the second locking member. In some cases, the engagement portion may include an annular retention member channel which may be configured to operably couple with the annular retention member. In an example embodiment, the engagement portion may further include a retention notch which may be configured to operably couple with the engagement groove on the motor shaft. In some cases, the body portion of each of the first and second locking members may include a sliding surface. In an example embodiment, the first and second locking members may contact each other at the respective sliding surfaces of the first and second locking members. In some cases, the sliding surfaces of each of the first and second locking members may slide relative to each other in the transient state. In an example embodiment, the locking assembly may enter the transient state responsive to the operator depressing the push tab on each of the first and second locking members. In some cases, the locking assembly may enter the transient state responsive to the insertion of a tip of the motor shaft that may force the first and second locking members out of the resting state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A soldering tool cleaning device, the device comprising:
 a housing;
 a motor enclosed within the housing;
 a brush assembly operably coupled to the motor; and an access window through which the brush assembly is accessible from a position outside of the housing, wherein the brush assembly comprises:
- a base portion comprising a cylindrical core member and a cleaning brush;
- a driving interface configured to transfer torque from the motor to the base portion; and
- a locking assembly disposed at a distal end of the base portion opposite the driving interface,
- wherein the cleaning brush is disposed around a perimeter of the core member and extends radially away from the core member,
- wherein the locking assembly comprises a first locking member, a second locking member, and an annular retention member,
- wherein the first and second locking members are configured to interface, and
- wherein the annular retention member defines a resting state in which the first and second locking members grip a motor shaft of the motor, and a transient state in which the first and second locking members move out of the resting state.

2. The device of claim 1, wherein the motor shaft comprises an engagement groove at a distal end, and wherein the first and second locking members engage with the engagement groove in the resting state to operably couple the brush assembly to the motor.

3. The device of claim 2, wherein the first and second locking members each comprise:
- a push tab configured to be depressed by an operator;
- an engagement portion configured to engage with the annular retention member and the motor shaft; and
- a body portion operably coupling the push tab to the engagement portion,
- wherein the body portion of the first locking member is disposed on an opposite side of the motor shaft from the body portion of the second locking member,
- wherein the engagement portion comprises an annular retention member channel configured to operably couple with the annular retention member, and
- wherein the engagement portion further comprises a retention notch configured to operably couple with the engagement groove on the motor shaft.

4. The device of claim 3, wherein the body portion of each of the first and second locking members comprises a sliding surface, and
- wherein the first and second locking members contact each other at the respective sliding surfaces of the first and second locking members.

5. The device of claim 4, wherein the sliding surfaces of each of the first and second locking members slide relative to each other in the transient state.

6. The device of claim 5, wherein the locking assembly enters the transient state responsive to the operator depressing the push tab on each of the first and second locking members.

7. The device of claim 5, wherein the locking assembly enters the transient state responsive to the insertion of a tip of the motor shaft that forces the first and second locking members out of the resting state.

8. The device of claim 1, wherein the driving interface of the core member comprises a receiving channel and key slots,
- wherein the driving interface operably couples to a brush drive ring comprising a drive projection and key projections, and
- wherein the receiving channel and key slots are configured to interface with the drive projection and key projections.

9. The device of claim 8, wherein the brush drive ring further comprises a drive pin recess that is configured to interface with a drive pin of the motor shaft.

10. The device of claim 9, wherein the motor shaft further comprises a retention groove proximate to the drive pin,
- wherein the retention groove is configured to operably couple to a drive ring retaining clip, and
- wherein the drive ring retaining clip is configured to hold the brush drive ring in contact with the drive pin of the motor shaft.

11. A brush assembly for a soldering tool cleaning device with a motor, the brush assembly comprising:
- a base portion comprising a cylindrical core member and a cleaning brush;
- a driving interface configured to transfer torque from the motor to the base portion; and
- a locking assembly disposed at a distal end of the base portion opposite the driving interface,
- wherein the cleaning brush is disposed around a perimeter of the core member and extends radially away from the core member,
- wherein the locking assembly comprises a first locking member, a second locking member, and an annular retention member,
- wherein the first and second locking members are configured to interface, and
- wherein the annular retention member defines a resting state in which the first and second locking members grip a motor shaft of the motor, and a transient state in which the first and second locking members move out of the resting state.

12. The brush assembly of claim 11, wherein the motor shaft comprises an engagement groove at a distal end, and wherein the first and second locking members engage with the engagement groove in the resting state to operably couple the brush assembly to the motor.

13. The brush assembly of claim 12, wherein the first and second locking members each comprise:
- a push tab configured to be depressed by an operator;
- an engagement portion configured to engage with the annular retention member and the motor shaft; and
- a body portion operably coupling the push tab to the engagement portion,
- wherein the body portion of the first locking member is disposed on an opposite side of the motor shaft from the body portion of the second locking member,
- wherein the engagement portion comprises an annular retention member channel configured to operably couple with the annular retention member, and
- wherein the engagement portion further comprises a retention notch configured to operably couple with the engagement groove on the motor shaft.

14. The brush assembly of claim 13, wherein the body portion of each of the first and second locking members comprises a sliding surface, and
- wherein the first and second locking members contact each other at the respective sliding surfaces of the first and second locking members.

15. The brush assembly of claim 14, wherein the sliding surfaces of each of the first and second locking members slide relative to each other in the transient state.

16. The brush assembly of claim 15, wherein the locking assembly enters the transient state responsive to the operator depressing the push tab on each of the first and second locking members.

17. The brush assembly of claim 15, wherein the locking assembly enters the transient state responsive to the insertion of a tip of the motor shaft that forces the first and second locking members out of the resting state.

18. The brush assembly of claim 11, wherein the driving interface of the core member comprises a receiving channel and key slots,
- wherein the driving interface operably couples to a brush drive ring comprising a drive projection and key projections, and
- wherein the receiving channel and key slots are configured to interface with the drive projection and key projections.

19. The brush assembly of claim 18, wherein the brush drive ring further comprises a drive pin recess that is configured to interface with a drive pin of the motor shaft.

20. The brush assembly of claim 19, wherein the motor shaft further comprises a retention groove proximate to the drive pin,
- wherein the retention groove is configured to operably couple to a drive ring retaining clip, and
- wherein the drive ring retaining clip is configured to hold the brush drive ring in contact with the drive pin of the motor shaft.

21. A locking assembly for a brush assembly of a soldering tool cleaning device with a motor, the locking assembly comprising:
- a first locking member, a second locking member, and an annular retention member,
- wherein the first and second locking members are configured to interface,
- wherein the annular retention member defines a resting state in which the first and second locking members grip a motor shaft of the motor, and a transient state in which the first and second locking members move out of the resting state,
- wherein the motor shaft comprises an engagement groove at a distal end, and wherein the first and second locking members engage with the engagement groove in the resting state to operably couple the brush assembly to the motor,
- wherein the first and second locking members each comprise:
  - a push tab configured to be depressed by an operator;
  - an engagement portion configured to engage with the annular retention member and the motor shaft; and
  - a body portion operably coupling the push tab to the engagement portion,
- wherein the body portion of the first locking member is disposed on an opposite side of the motor shaft from the body portion of the second locking member,
- wherein the engagement portion comprises an annular retention member channel configured to operably couple with the annular retention member, and
- wherein the engagement portion further comprises a retention notch configured to operably couple with the engagement groove on the motor shaft.

22. The locking assembly of claim 21, wherein the body portion of each of the first and second locking members comprises a sliding surface, and
- wherein the first and second locking members contact each other at the respective sliding surfaces of the first and second locking members.

23. The locking assembly of claim 22, wherein the sliding surfaces of each of the first and second locking members slide relative to each other in the transient state.

24. The locking assembly of claim 23, wherein the locking assembly enters the transient state responsive to the operator depressing the push tab on each of the first and second locking members.

25. The locking assembly of claim 23, wherein the locking assembly enters the transient state responsive to the insertion of a tip of the motor shaft that forces the first and second locking members out of the resting state.

* * * * *